United States Patent
Militzer et al.

(10) Patent No.: US 7,740,464 B2
(45) Date of Patent: Jun. 22, 2010

(54) DEVICE FOR POST-TREATING TYRES

(75) Inventors: Jeannette Militzer, Hamburg (DE); Stefan Bahlke, Schnakenburg (DE); Rüdiger Meincke, Hamburg (DE); Horst Enoch, Hamburg (DE)

(73) Assignee: Harburg-Freudenberger Maschinenbau GmbH, Hamburg (DE)

( * ) Notice: Subject to any disclaimer, the term of this patent is extended or adjusted under 35 U.S.C. 154(b) by 0 days.

(21) Appl. No.: 12/087,551

(22) PCT Filed: Jan. 9, 2007

(86) PCT No.: PCT/DE2007/000023

§ 371 (c)(1), (2), (4) Date: Dec. 8, 2008

(87) PCT Pub. No.: WO2007/079723

PCT Pub. Date: Jul. 19, 2007

(65) Prior Publication Data

US 2009/0175975 A1 Jul. 9, 2009

(30) Foreign Application Priority Data

Jan. 10, 2006 (DE) .................. 10 2006 001 418

(51) Int. Cl.
*B29D 30/06* (2006.01)
(52) U.S. Cl. .................................... 425/58.1
(58) Field of Classification Search .................. 425/38, 425/58.1
See application file for complete search history.

(56) References Cited

U.S. PATENT DOCUMENTS

| 3,792,145 | A | | 11/1966 | Hugger et al. |
| 3,477,100 | A | * | 11/1969 | Pech et al. ................. 425/58.1 |
| 3,621,520 | A | * | 11/1971 | Ulm ........................ 425/58.1 |
| 3,659,974 | A | * | 5/1972 | Neugroschl ................ 425/58.1 |
| 4,702,669 | A | | 10/1987 | Ichikawa et al. |
| 5,681,594 | A | * | 10/1997 | Irie ......................... 425/58.1 |
| 7,001,559 | B2 | * | 2/2006 | Oobayashi et al. .......... 425/58.1 |
| 7,281,916 | B2 | * | 10/2007 | Ito et al. .................... 425/38 |

FOREIGN PATENT DOCUMENTS

| DE | 1 778 859 | 8/1971 |
| DE | 1 729 838 | 5/1972 |
| DE | 691 12 948 | 4/1996 |
| EP | 0 143 538 | 6/1985 |
| EP | 1 568 475 | 8/2005 |
| EP | 1 657 049 | 5/2006 |

\* cited by examiner

*Primary Examiner*—James Mackey
(74) *Attorney, Agent, or Firm*—Friedrich Kueffner

(57) ABSTRACT

The invention relates to a device comprising a receiving device (3) for post-treating tires (1). After vulcanizing the elastomer material, the tires (1) are subjected to internal pressure by means of support gas, and cooled. Said receiving device (3) is embodied such that it can maintain the tires (1) and also seal the inner chamber of the tires. Also, a pressurized gas supply is connected to the receiving device (3). Said receiving device (3) comprises at least two fixed receiving areas (4) for at least two tires (1). The tires undergo at least one introduction process using a positionable handling device (19).

7 Claims, 5 Drawing Sheets

DEVICE FOR POST-TREATING TYRES

Figure 1:
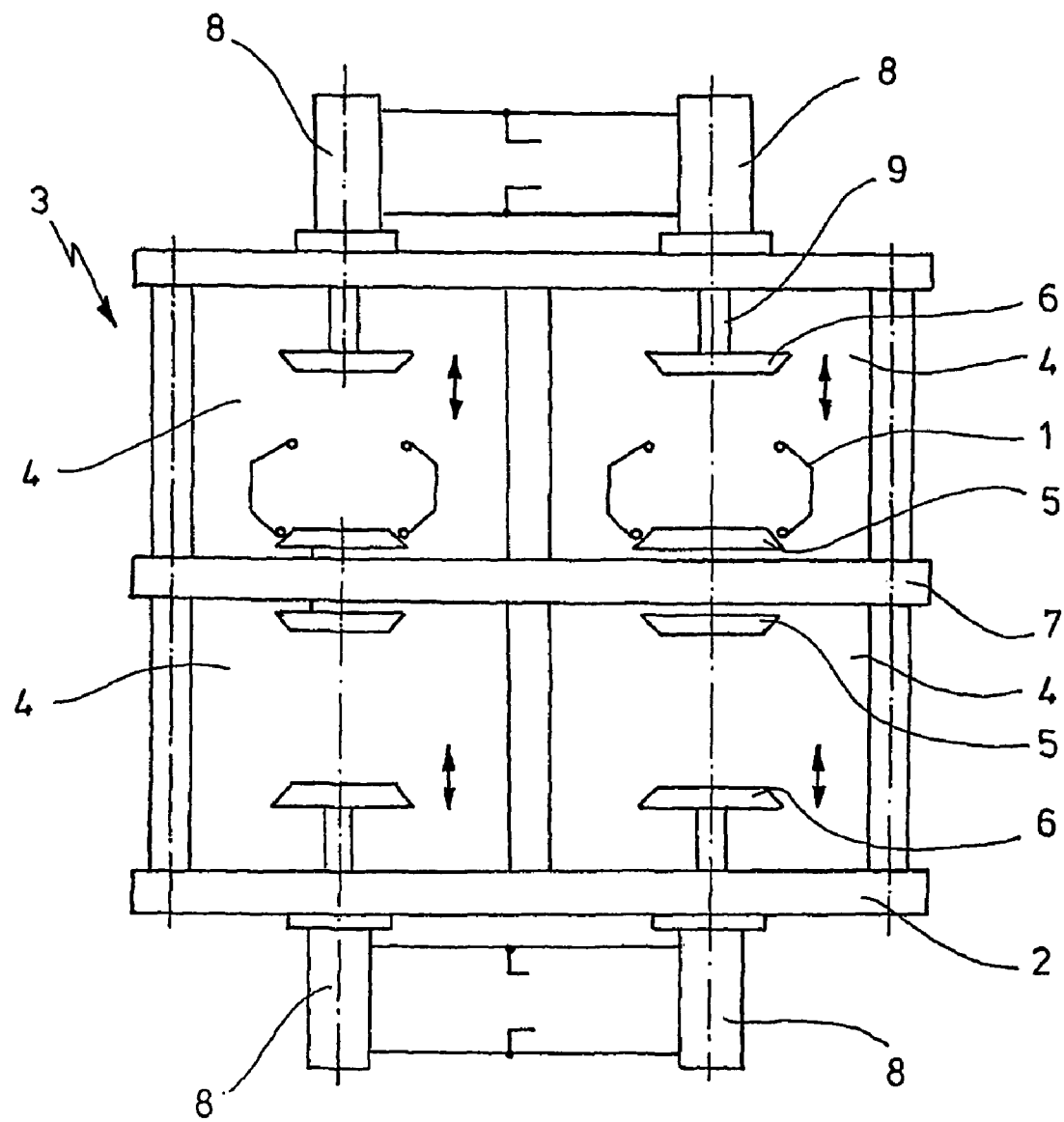

The invention relates to an apparatus with a receiving device for the post-treatment of tires, which, after a vulcanization of their elastomer material, are subjected by a support gas with an internal pressure and are cooled, wherein the receiving device is configured for supporting the tires and for sealing an interior space of the tires, and wherein the receiving device is connected to a compressed gas supply.

In known apparatus of this type, the apparatus includes at least two receiving devices which are arranged so as to be pivotable relative to an axis of rotation. As a result, several post-treatment locations are made available and simultaneously, charging at always the same location is made possible.

It is the object of the present invention to construct an apparatus of the type described above in such a way that an inexpensive manufacture of the apparatus is facilitated.

In accordance with the invention, this object is met in that the receiving device has at least two receiving areas which are arranged so as to be stationary for at least two tires, and wherein at least one introduction of the tires takes place with the use of a positionable handling device.

The invention provides in particular that at least two receiving areas of the apparatus are arranged so as to be stationary and an introduction of the tires to be posed-treated is effected with the use of a suitably positionable handling device.

A compact arrangement is achieved by arranging the at least two receiving areas in a vertical direction one above the other.

A further marginal arrangement can be effected by arranging the at least two receiving areas next to each other in the horizontal direction.

For making sufficiently high clamping forces available, it is provided that support elements for the tires can be clamped relative to each other hydraulically.

A simple construction is facilitated by loading and unloading the receiving device only from one side.

In order to reduce the number of the necessary structural elements, it is proposed that loading as well as unloading is carried out with a modified press discharger.

An adaptation to the tire geometry at a given time is effected by constructing the support elements as wheel plates.

The number of movable structural elements is minimized by arranging one of the support elements so as to be stationary and the other so as to be positionable.

A requirement for reduced sealing measures is facilitated by having the compressed gas supply take place to the interior of the tire through the stationary support element.

The sealing of the interior of the tire is facilitated by making it possible to apply, in a first process step, a pretension pressure to the tire through a valve arrangement.

For carrying out the actual cooling process it is provided that is a second process step the tire can be subjected to a principal pressure through a valve arrangement.

The drawing shows embodiments of the invention.

Figure 2:
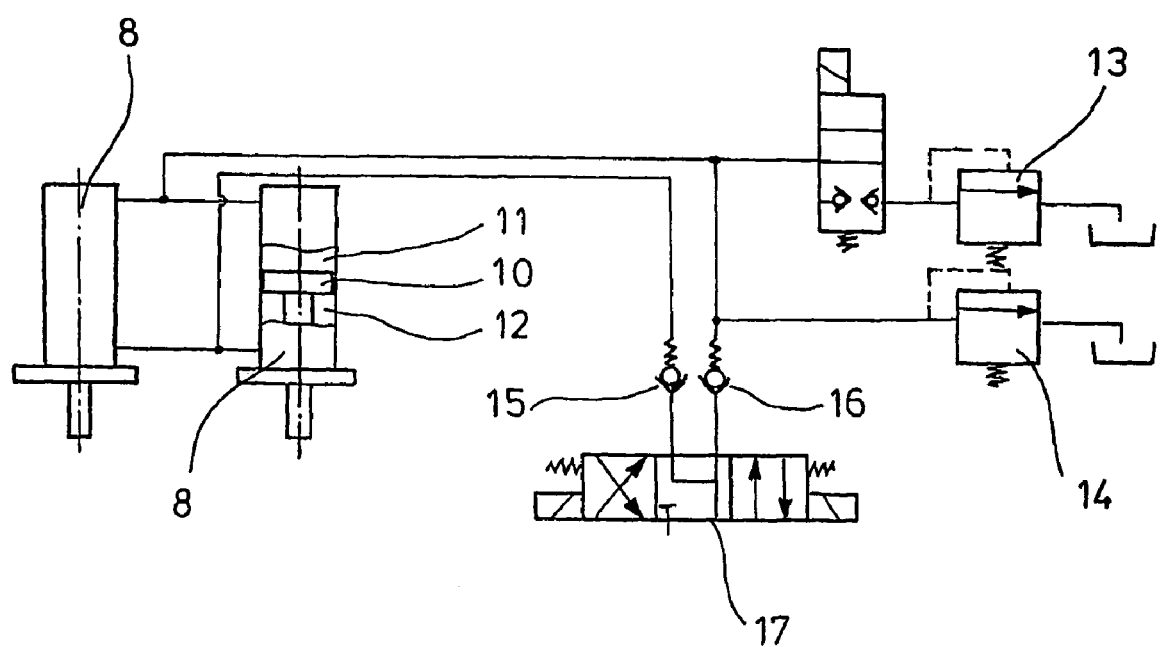
Figure 3:
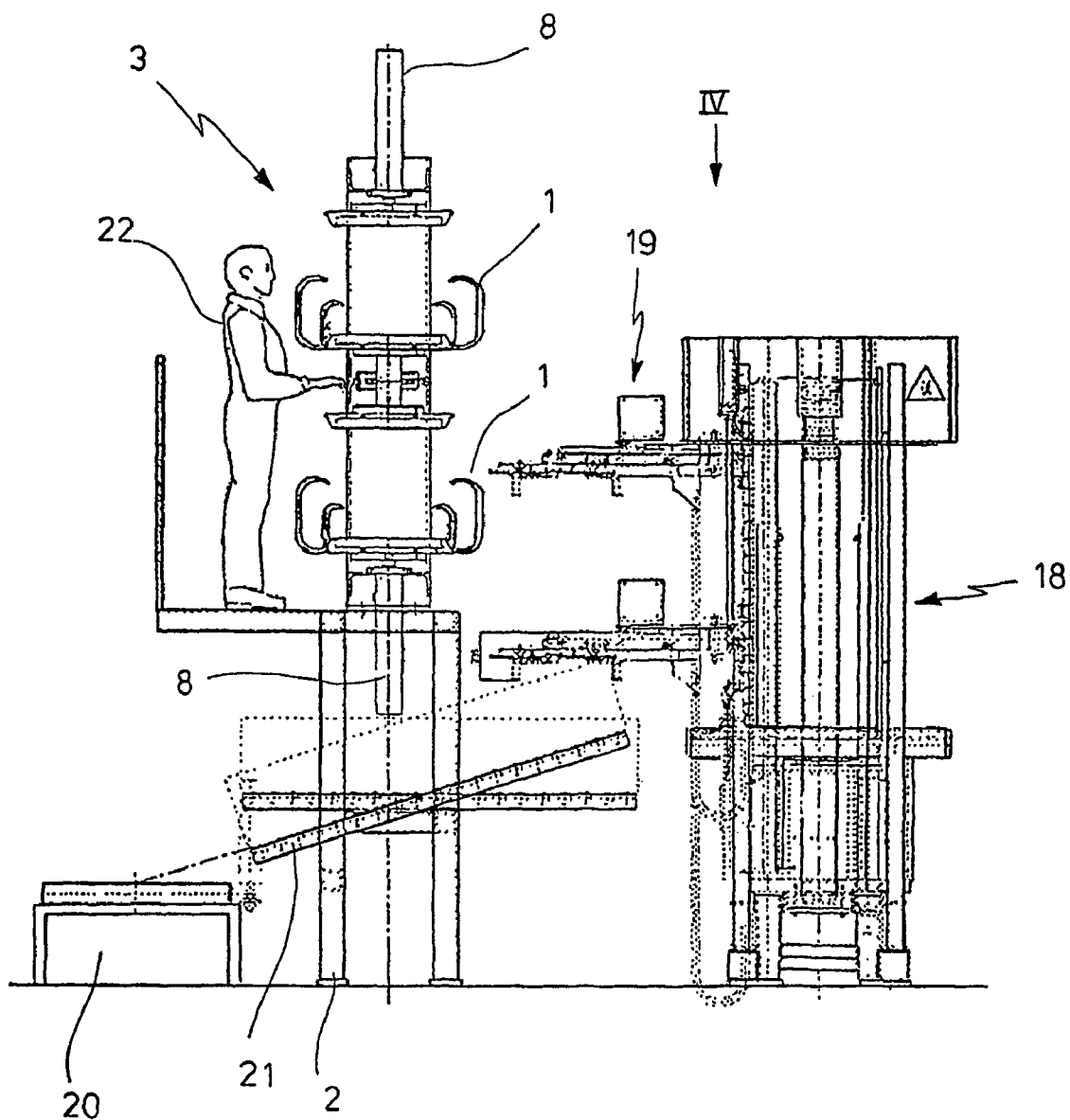
Figure 4:
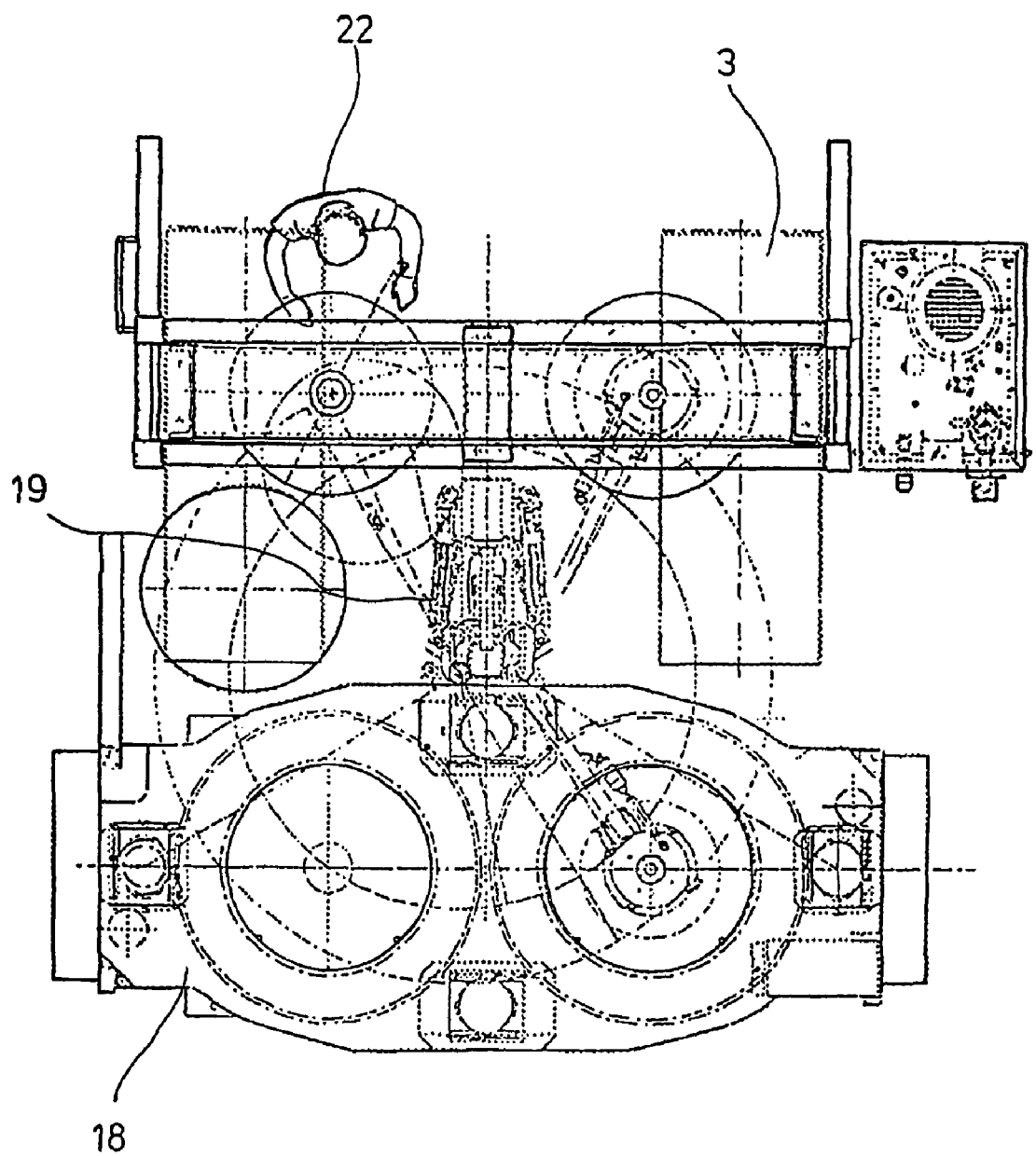
Figure 5:
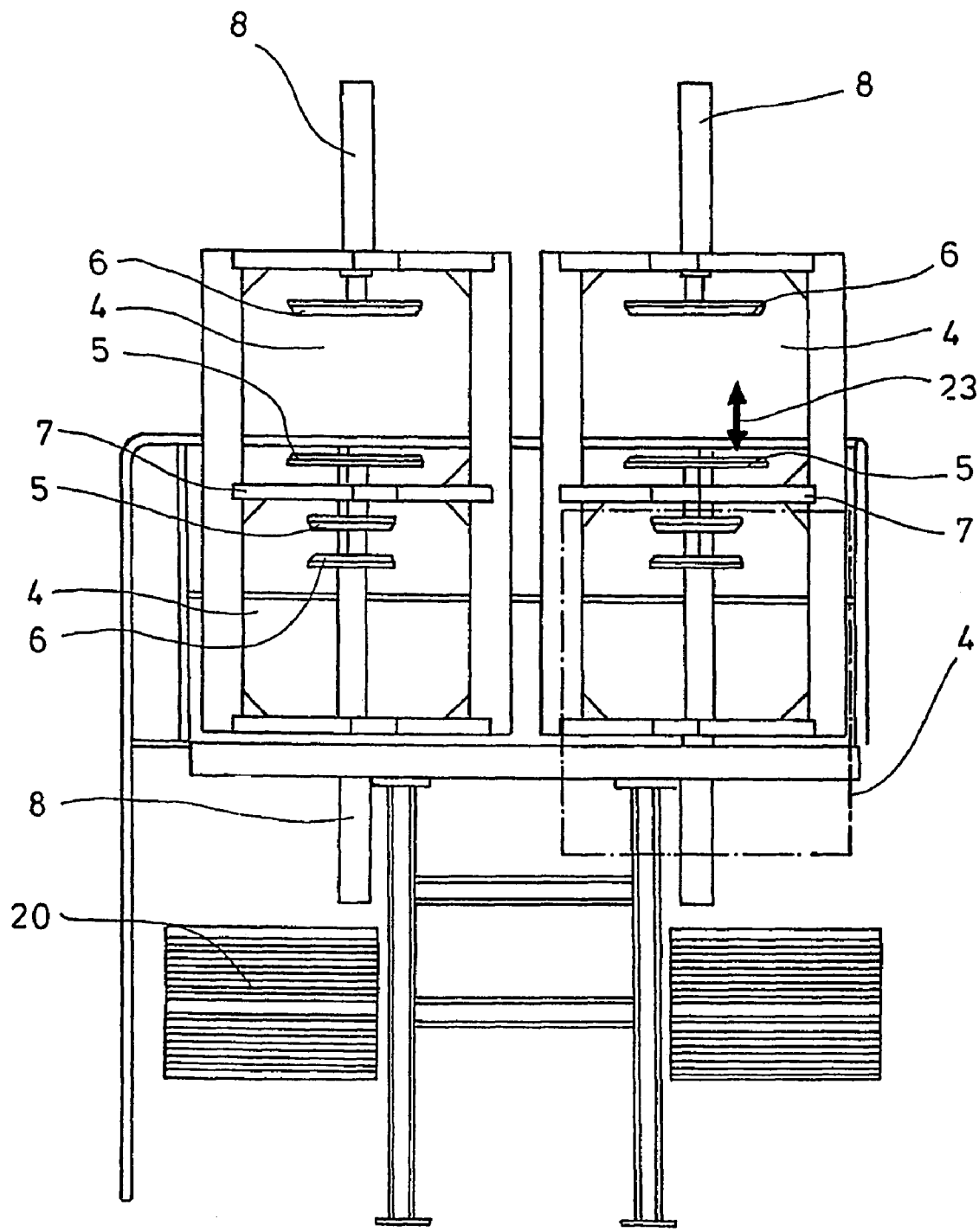

In the drawing:

FIG. 1 is a schematic side view of an apparatus with four receiving areas for tires to be post-treated, FIG. 2 is a schematic illustration of the hydraulic circuit, FIG. 3 is a side view of an apparatus for the post-treatment of tires arranged next to a tire heating press and a handling device, FIG. 4 is a top view of the apparatus shown in FIG. 3 as seen in the viewing direction IV in FIG. 3 and, FIG. 5 is a more detailed illustration of the arrangement of FIG. 1.

FIG. 1 shows an apparatus for the post-treatment for tires 1, wherein in the area of a machine frame 2 is arranged a receiving device for the tires 1. In the illustrated embodiment, the receiving device 3 is provided with four receiving areas for the tires 1. As shown in FIG. 1, always two receiving areas 4 are arranged next to each other and above each other, so that a rectangular basic structure of the receiving device 3 is provided.

The first and second wheel plates 5, 6 are arranged in the area of each receiving area 4. The first wheel plates 5 are rigidly connected to a cross member 7 which is arranged so as to be stationary. The second wheel plates 6 are arranged so as to be positionable relative to the machine frame 2. Used for positioning the wheel plates 6 are hydraulic cylinders 8, wherein the second wheel plates 6 are attached to the plunger 9 of the cylinders 8. A symmetrical construction is facilitated by arranging the hydraulic cylinders 8 in pairs facing in opposite directions.

FIG. 2 shows a hydraulic diagram for the pressure supply of the hydraulic cylinders 8. In the hydraulic cylinder 6 which is shown partially in section, it can be seen that the plunger 9 is connected to a piston 10. The piston 10 divides an interior of the hydraulic cylinder 8 into an upper control chamber 11 and a lower control chamber 12. To both control chambers 11, 12 it is possible to admit actively a controlled pressure, so that the piston 10 can be positioned actively forwardly as well as rearwardly. The upper control chambers 11 are connected to a valve arrangement 13 for making available a pretension pressure, moreover, the upper control chambers 11 can also be subjected to a valve arrangement 14 for making available a principal pressure. Both control chambers 11, 12 are coupled through check valves 15, 16 to at least one pressure relieve valve 17.

FIG. 3 shows in a side view an overview presentation in which the receiving device 3 is arranged laterally next to a tire heating press 18. The tires 1 are transported by a handling device 19 from the tire heating press 18 to the receiving device 3 and are introduced into the receiving device 3. Tires which are sufficiently cooled in the area of the receiving device 3 are transferred once again from the handling device 19 to the receiving device 3 and are transferred to a discharge device 20. In the illustrated embodiment, the transfer takes place with the intermediate arrangement of a transport line 21.

FIG. 4 is a top view of the arrangement of FIG. 3. The size relationships are demonstrated by a human operator 22 shown in the drawing.

FIG. 5 shows the arrangement according to FIG. 1 in a more detailed illustration. A tire 1, not illustrated in FIG. 5, is placed with the use of the handling device 19, also not shown in FIG. 5, is placed into the two upper receiving areas 4 onto the first wheel plate 5. By using the hydraulic cylinder 8, the second wheel plate 6 is subsequently moved in the direction toward the tire 1, and, as a result, seals together with the first wheel plate 5 an interior space of the tire 1 so as to be pressure-tight.

The tire 1 is during this step compressed to a greater extent than its nominal width 23. This ensures a secure sealing effect. In this state of operation the hydraulic cylinder 8 produces together with the valve arrangement 13 shown in FIG. 2 a pretension pressure P1.

After the interior of the tire 1 has been sealed off as described above, the required pressurized gas, usually compressed air, is conducted into the tire 1 through the cross members 7 and the first wheel plate 5. Because of a subsequent increase in the internal pressure in the area of the tire 1, the second tire plate 6 is pushed back against the pretension pressure P1 of the hydraulic cylinder 6 until the tire 1 is expanded to its nominal width 23. After reaching this nominal width 23, a hydraulic pressure P2 is applied to the hydraulic cylinder 8 with the use of the valve arrangement 14 shown in FIG. 2 and is held in this position. A position sensor for the actual width of the tire 1 and particularly for sensing whether the nominal width 23 has been reached can take place through switches or distance sensor systems. The pressure P2 is greater than the pressure P1.

The arrangement shown in FIG. 5 with four receiving devices 3 is suitable for providing a post-treatment capacity for a conventional double heating press. After the tire 1 has been sufficiently cooled in the area of the receiving device 3 initially the internal pressure is released from the tire 1 and subsequently the plunger 9 of the hydraulic cylinder 8 is pushed back with the second wheel plate 6. The handling device 13 then removes the cooled tire from the receiving device 3 and transfers the tire to the discharge device 20.

In accordance with a preferred embodiment, a handling surface is arranged on a rear side of the receiving device 3 in order to facilitate an exchange of the wheel plates 5, 6 and a storage of the wheel plates 5, 6 which are not required at a given time.

In accordance with the embodiment of FIG. 5, always two receiving areas 4 are arranged vertically one above the other and are combined to form a functional module. Any number of such functional modules can be placed together in order to make available a necessary post-treatment capacity. It is also possible to combine the four receiving areas 4 shown in FIG. 5 as a functional module and to make available a necessary capacity by combining such four-modules.

The post-treatment of the tires serves essentially for the cooling of the tire material until the sufficient stability with respect to shape of the tire material has been reached. The cooling takes place through a heat transfer to the ambient air and to the wheel plates 5, 6. Cooling can be further facilitated by blowing cooling air against the tires. The pressurized gas conducted during the cooling process into the tires 1 serves essentially for supporting the tire and, thus, stabilization during the cooling process. As a result, deformations before reaching a sufficient shape stability are avoided.

The invention claimed is:

1. Apparatus with a receiving device (3) for the post-treatment of tires (1), wherein, following a vulcanization of an elastomer material of the tires, an internal pressure is admitted to the tires by a support gas and the tires are cooled, wherein the receiving device (3) is configured for supporting the tire (1) and for sealing a tire interior and is connected to a pressurized gas supply, wherein the receiving device (3) has at least two receiving areas (4) arranged vertically one above the other for at least two tires (1) which are arranged so as to be stationary, and at least one introduction of the tires (1) takes place with the use of a positionable handling device (19), wherein the tires are internally pressurized and cooled after being introduced into the receiving device (3), wherein the receiving device includes support elements for the tires (1), which support elements are configured as wheel plates (5, 6) arranged above one another and clampable hydraulically relative to each other.

2. Apparatus according to claim 1, wherein the receiving device is configured to be loadable and unloadable from only one side.

3. Apparatus according to claim 2, wherein a press charger is provided for loading as well as unloading the receiving device.

4. Apparatus according to claim 1, wherein one of the support elements is arranged so as to be stationary and the other so as to be positionable.

5. Apparatus according to claim 4, wherein a compressed gas supply to an interior of the tire (1) is effected by the stationary support element.

6. Apparatus according to claim 1, wherein a pretension pressure is supplied to the tire (1) in a first process step through a valve arrangement (13).

7. Apparatus according to claim 1, wherein the tire (1) is subjected to a principal pressure in a second process step through a valve arrangement (14).

* * * * *